United States Patent [19]

Tokita et al.

[11] Patent Number: 5,459,701
[45] Date of Patent: Oct. 17, 1995

[54] MAGNETO-OPTICAL RECORDING METHOD

[75] Inventors: Toshiaki Tokita, Zama; Motoharu Tanaka; Atsuyuki Watada, both of Kawasaki; Yoshiko Kurosawa, Yokohama, all of Japan

[73] Assignee: Ricoh Company, Ltd., Tokyo, Japan

[21] Appl. No.: 900,172

[22] Filed: Jun. 17, 1992

[30] Foreign Application Priority Data

| Jun. 17, 1991 | [JP] | Japan | 3-173191 |
| Jun. 21, 1991 | [JP] | Japan | 3-177391 |
| Jul. 1, 1991 | [JP] | Japan | 3-186820 |
| Jul. 15, 1991 | [JP] | Japan | 3-200020 |
| Aug. 6, 1991 | [JP] | Japan | 3-221125 |

[51] Int. Cl.$^6$ ............................... G11B 13/04
[52] U.S. Cl. ............................... 369/13; 369/116
[58] Field of Search ................ 369/13, 14, 110, 369/116; 360/59, 114; 365/122

[56] References Cited

U.S. PATENT DOCUMENTS

| 4,610,009 | 9/1986 | Connell | 369/13 |
| 4,907,211 | 3/1990 | Horimai et al. | 369/13 |
| 5,170,382 | 12/1992 | Yamada et al. | 369/13 |
| 5,200,935 | 4/1993 | Watanabe et al. | 369/13 |
| 5,218,591 | 6/1993 | Shimamoto et al. | 369/116 |
| 5,323,366 | 6/1994 | Watada et al. | 369/13 |

*Primary Examiner*—Georgia Y. Epps
*Assistant Examiner*—Tan Dinh
*Attorney, Agent, or Firm*—Cooper & Dunham

[57] ABSTRACT

A magneto-optical recording method is capable of carrying out overwriting on a magneto-optical recording medium including a single perpendicular magnetic layer serving as a recording layer, by applying laser beams thereto, thereby controlling the formation and erasure of magnetic domains, in which a magnetic domain with a desired length can be formed or erased by the application of a plurality of laser beams during the formation and erasure of the magnetic domains.

7 Claims, 10 Drawing Sheets

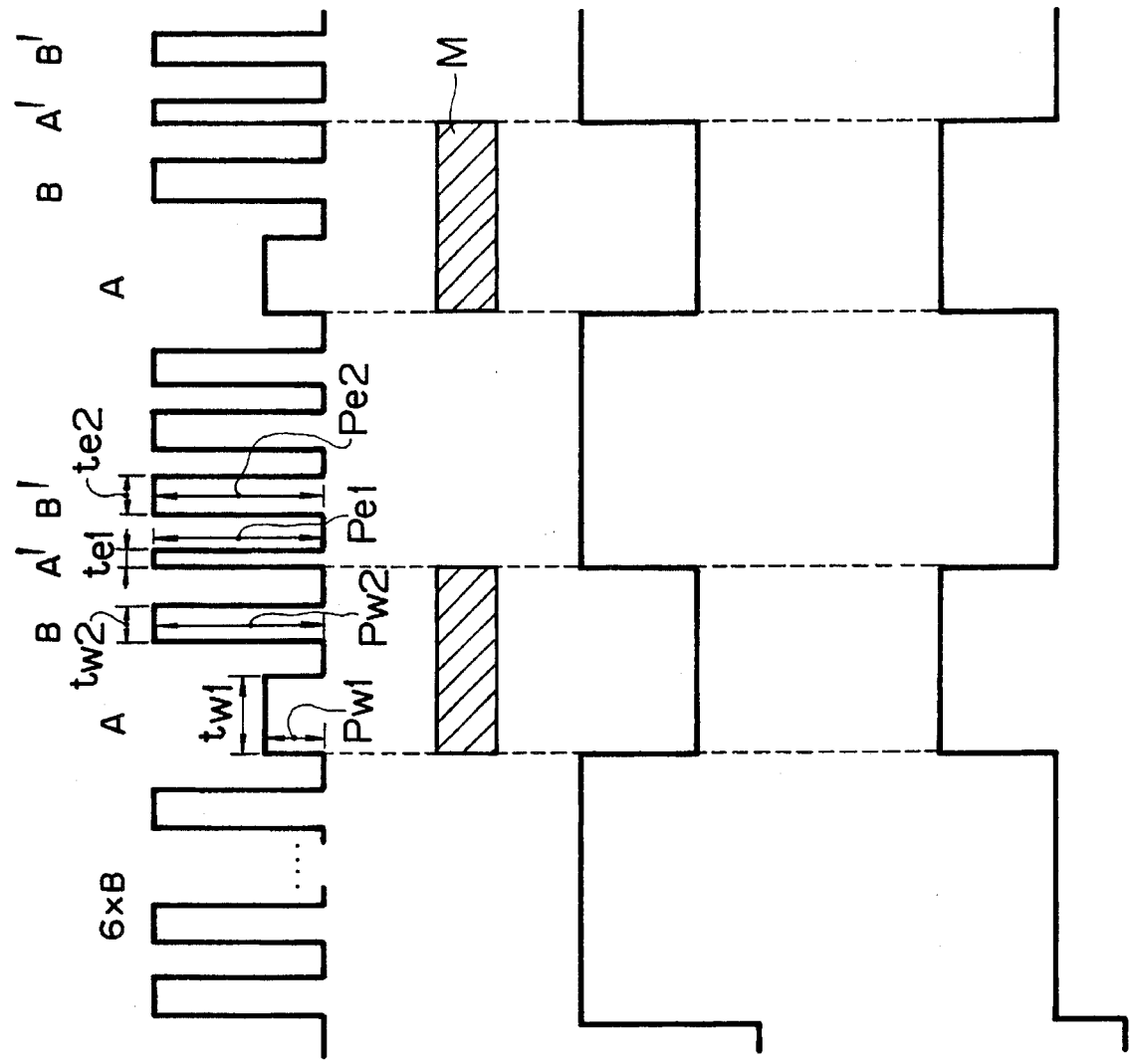

MAGNETO-OPTICAL RECORDING METHOD

BACKGROUND OF THE INVENTION

1. Field of the Invention

The present invention relates to a magneto-optical recording method for accomplishing overwriting at high speed by means of a demagnetizing field, using a magneto-optical recording medium comprising a single perpendicular magnetic layer which serves as a recording layer.

2. Discussion of Background

In recent years, research and development has been energetically undertaken to provide a magneto-optical recording medium utilizing magneto-optical effects, as an optical recording medium on which repeated rewriting is possible, and generally such a medium has been put to practical use. This magneto-optical recording medium has the advantage of large volume, high density recording, non-contact recording and reproduction, and ease of access, in addition to being looked on as a promising medium for utilization in document data files, video and still-picture files, computer memories, and the like, because rewriting is possible. However, there are many technical problems in providing a magneto-optical recording medium as a recording medium with a performance equivalent to or greater than that of a magnetic disk. One of the main problems relates to overwrite technology.

At the present time, to rewrite data on commercially available magneto-optical recording media, it is first necessary to take the step of erasing the original data. The new data may then be written in. These repeated erasures represent wasted time. Overwrite technology can eliminate this drawback. The overwrite technology which has been proposed up to the present time is divided into two types—a magnetic field modulation method, and a light modulation method such as a multi-beam method, and a two-layer film method as described in H. Iida et al.: J. J. of Appl. Phys., Vol. 28(1989) p. 367.

In the magnetic field modulation method, recording is carried out by reversing the polarity of the applied magnetic field in accordance with the recorded data while the light is maintained at a uniform intensity. In this method, studies have been made with respect to the use of a flotation type magnetic head to reverse the magnetic field at high speed, for instance, as disclosed in Japanese Laid-Open Patent Applications 63-204532 and 63-217548. However, changing the medium is difficult. This can cause problems. Also, only one side of the magnetic-optical recording medium can be used, which cuts the recording capacity in half.

In the light modulation method, on the other hand, recording is performed by an ON/OFF action or intensity modulation of a laser beam to be applied corresponding to a recording data, while applying a uniform magnetic field.

The multi-beam method of the light modulation method is a pseudo-overwrite method in which two or three laser beams are used and data is recorded and erased by reversing the direction of the magnetic field for each rotation of the magneto-optical recording medium. However, this method has the drawback that the structure of the device is complicated so that the cost is therefore increased.

In the two-layer film method, the recording layer of the magneto-optical recording medium is made up of a two-layer film and overwriting is achieved, for example, as disclosed in Japanese Laid-Open Patent Application 62-175948. In the method outlined in this Laid-Open Patent Application, a magneto-optical recording medium provided with, for example, a recording layer composed of TbFe and an auxiliary layer composed of TbFeCo is used. In this method, it is intended to achieve overwriting, after initialization, by applying an external magnetic field and laser beams with different powers. Specifically, in recording by this method, the auxiliary layer is magnetized in one direction by means of a magnetic field of about 4 KOe for initialization prior to recording, and a high-output laser beam is applied so that the temperature of the medium is elevated to a temperature T where T>Tc2 in which Tc2 is the Curie temperature of the auxiliary layer. A recording magnetic field is then applied in the opposite direction to the initialization magnetic field, so that the magnetization direction of the auxiliary layer is reversed, and when the medium is cooled, data is recorded by the transference of this magnetization to a memory layer. In addition, erasure is performed by applying a low-output laser beam so that the temperature of the medium is elevated to a temperature T where Tc1<T<Tc2 is which Tc1 is the Curie temperature of the recording layer, and transferring the direction of magnetization of the auxiliary layer to the memory layer. However, while this method has the advantage of high speed, the laser power during write-in is high, and there is the additional problem that an extremely large magnetic field must be applied in the advance initialization process for overwriting. As outlined above, many methods have been proposed as overwrite methods in magneto-optical recording, but all of these have as many demerits as merits, and many breakthroughs are required to put these methods to practical use.

An overwrite method utilizing a demagnetizing field in has been proposed (Han-Ping: Appl. Phys. Lett., 49, p 8 (1986)). In this method, a magneto-optical recording medium provided with a recording layer with a compensation point several tens of degrees (° C.) higher than room temperature is used, and overwriting is possible without using an external magnetic field.

To briefly outline the principles of this method, recording is performed by applying a first laser beam to the position on the recording layer where recording is intended. When this laser beam is applied, the laser-beam applied section is heated to a temperature higher than the compensation point Tcomp thereof, so that the magnetization in that section is reversed, and at the same time a demagnetizing field is produced in the opposite direction. The magnetization is reversed by this demagnetizing field, so that a domain wall is formed. Then, a recording magnetic domain is formed during the cooling process after the completion of the application of the laser beam.

Erasure is performed by applying a second laser beam directly onto the recording magnetic domain. The temperature of the section to which this laser beam is applied is elevated to a temperature higher than the compensation point Tcomp, so that the magnetization throughout the recording magnetic domain is reversed, and at the same time, a demagnetizing field is formed in the opposite direction. As a result of the formation of this demagnetizing field, the magnetization of the center section of the recording magnetic domain is once again reversed and a second domain wall is formed, but the second domain wall is caused to disappear by domain wall displacement. The recording magnetic domain is erased during the cooling process after the completion of the application of the laser beam.

This method is a type of light modulation method, and the recording medium for this method of a type having a single layer structure. This method is attracting attention because, compared with a two-layer recording medium, there is a high possibility of recording with low power, and a magnetic field for initialization is unnecessary.

However, in this method, the previously-recorded signal must first be detected prior to overwriting, and the detected signal must be compared with a new signal to be written in to make a decision as to whether the laser beam is to be applied or not. Therefore, either two laser beams must be provided—one for recording and one for detection—or one laser beam must provide the two functions of recording and detection, necessitating two rotations for one track. In addition, when the laser beam is applied, the magnetic domain in which data was previously recorded must be precisely positioned. Accordingly, in overwriting, the function of reading the signal which was previously recorded, the function of deciding whether or not to apply the laser beam by comparing this signal with the new signal to be recorded, and the function of positioning the laser beam to be directly applied onto the previously written-in signal must be provided in an apparatus using this overwrite method. The structure of the apparatus therefore becomes complicated. An additional drawback of this method is the fact that it cannot be applied to the mark-length modulation method.

In Japanese Laid-Open Patent Application 1-119941, an overwrite method is disclosed in which a single laser pulse is used in the formation of a magnetic domain, and a plurality of laser pulses narrower than those used during recording is used during erasure of the magnetic domain. In this method, however, if it is tried to form the magnetic domain shown in FIG. 8(b) by applying, for instance, the laser pulse illustrated in FIG. 8(a), the edge portion of the rear end of the magnetic domain is not fixed, and, as shown in FIG. 8(c), a phenomenon by which a cylindrical magnetic domain moves, following the laser beam, or, as shown in FIG. 8(d), a phenomenon by which the shape of the edge portion of the magnetic domain is deformed, is occasionally observed. Controlling this phenomenon by applying a single pulse of a laser is extremely difficult. Accordingly, this method is unsuitable for the mark-length modulation of signals, and mark edge recording.

SUMMARY OF THE INVENTION

Accordingly, an object of the present invention is to provide, with due consideration to the drawbacks of such conventional methods, a magneto-optical recording method whereby reliable and superior overwriting is accomplished at high speed with an apparatus of simple structure.

Another object of the present invention is to provide a magneto-optical recording method suitable for using the mark-length modulation method.

A further object of the present invention is to provide a magneto-optical recording method by which the utilization efficiency of laser beams from a light head can be increased, the necessary laser output can be reduced to decrease the size and cost of a magneto-optical recording apparatus, with adverse effects on a track in a magneto-optical recording medium provided in the transverse direction thereof being minimized, thereby secure overwrite operation and high track density being accomplished.

The first and second objects of the present invention can be achieved by a first magneto-optical recording method capable of carrying out overwriting on a magneto-optical recording medium comprising a single perpendicular magnetic layer serving as a recording layer, by applying laser beams thereto, thereby controlling the formation and erasure of magnetic domains, in which a magnetic domain with the desired length can be formed or erased by the application of a plurality of laser beams during the formation and erasure of the magnetic domains. In the above method, it is preferable that a plurality of one type of laser pulses be applied or a plurality of two types of laser pulses be combined and applied during each of the formation or the erasure of the magnetic domain.

The first and second objects of the present invention can also be achieved by a second magneto-optical recording method capable of carrying out overwriting on a magneto-optical recording medium comprising a single perpendicular magnetic layer serving as a recording layer by application of a laser beam with the application conditions thereof changed in such a manner that the laser beam application interval (D) with respect to the moving direction along a track on the magneto-optical recording medium and the width (W) of a magnetic domain on the magneto-optical recording medium are in the relationship of $0.1\ W \leq D \leq 2.0\ W$, under the application of a predetermined external magnetic field.

The above objects, in particular, the third object of the present invention can be achieved by a third magneto-optical recording method capable of carrying out overwriting on a magneto-optical recording medium comprising a perpendicular magnetic layer serving as a recording layer by the application of a laser beam in an elliptic shape elongated in the direction of a track in the magneto-optical recording medium, with the power and/or pulse width thereof changed, thereby controlling the domain wall displacement in the perpendicular magnetic layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7(a) to 7(d) are diagrams in explanation of the conditions for applying a laser beam during recording and erasure by a method (B) of the first magneto-optical recording method according to the present invention.

DETAILED DESCRIPTION OF THE PREFERRED EMBODIMENTS

Figure 1:
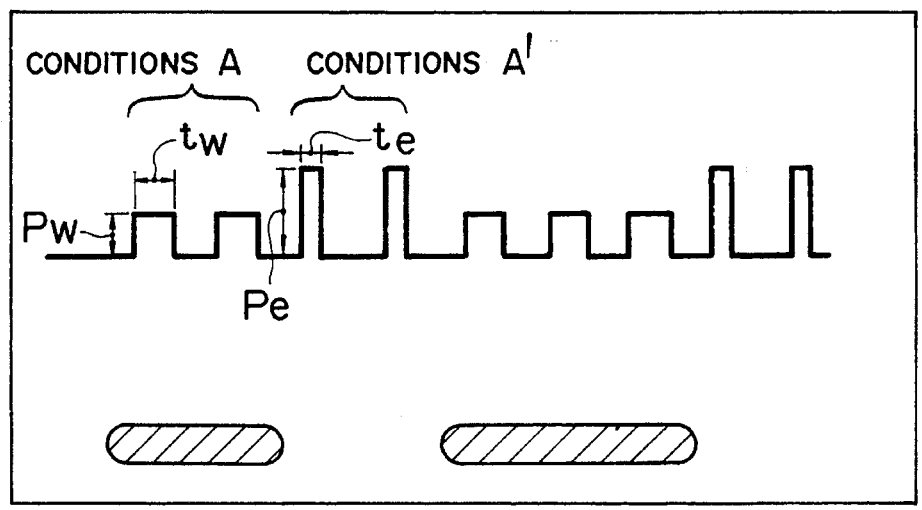
FIG. 1 is a schematic diagram in explanation of the conditions for applying the laser beam during recording and erasure by a method (A) of a first magneto-optical recording method according to the present invention.

In the first magneto-optical recording method according to the present invention, it is preferably that, when the intensity of the laser pulse applied during the formation of the magnetic domain is Pw and the pulse width is tw, and when the intensity of the laser pulse applied during the erasure of the magnetic domain is Pe and the pulse width is te, the relationships $tw \geq te$, and $Pw \cdot tw > Pe \cdot te$ be satisfied.

It is further preferable that, in the case where during the formation and the erasure of the magnetic domain a plurality of two types of laser pulses is combined and applied, the first laser pulse, and the second and subsequent pluses be of a different type during both the formation and the erasure of the magnetic domain. It is more preferable that when the intensity of the first laser pulse applied during the formation of the magnetic domain is Pw1 and the pulse width is tw1, and the intensity of the second and subsequent laser pulses applied during the formation of the magnetic domain is Pw2 and the pulse width is tw2; and when the intensity of the first laser pulse applied during the erasure of the magnetic domain is Pe1 and the pulse width is te1 and the intensity of the second and subsequent laser pulses applied during the erasure of the magnetic domain is Pe2 and the pulse width is te2; the relationships:

$Pw1 < Pe1$ $Pw1 \cdot tw1 > Pe1 \cdot te1$ $Pw2 = Pe2$, and $tw2 = te2$ be simultaneously satisfied.

With the present invention, because a plurality of laser pulses is applied when the magnetic domain is formed, a cylindrical magnetic domain is formed by the application of a first laser pulse, and in the application of a second laser pulse, the application is carried out at a position where the center of the application is shifted a predetermined distance only. Heat transmission caused by this laser pulse application exerts a very small influence on the domain wall on the side far from the application center of the above-mentioned cylindrical magnetic domain, so that the domain wall in this section is pinned. The same thing occurs when a third and subsequent laser pulses are applied, and the edge of the magnetic domain is securely pinned or fixed. Thus the magnetic domain is easily formed to the desired length. In addition, when the magnetic domain is erased by the application of a plurality of laser pulses with a shape differing from that when the magnetic domain is formed, the sum of the demagnetizing field energy imposed on the domain wall section, the domain wall energy, and the Zeeman energy is at a lower state when the magnetic domain is shrunk, and the magnetic domain is erased over the desired length with no unerased part remaining. Accordingly, a new signal can be recorded, unrelated to the signals for previous write-in signals, and also, a high-speed, highly reliable overwrite is achieved with a device of simple construction.

The first magneto-optical recording method of the present invention will now be explained in more detail. In this magneto-optical recording method, a magnetic domain with a desired length is formed on a magneto-optical recording medium comprising a single perpendicular magnetic layer serving as a recording layer, with no relation to previously recorded signals, by the application of a plurality of laser pulses, and, in the same manner, a plurality of laser pulses is applied to erase the magnetic domain over a desired length. When the signal is recorded or erased, a predetermined, external magnetic field of from several tens to several hundreds Oe is applied to the section of the magneto-optical recording medium on which the laser beam is applied, but, depending on the characteristics and the like of the medium used, the application of the external magnetic field is not always necessary.

Furthermore, this magneto-optical recording method can be classified into the following two types, according to the way the laser pulse is applied:

A method (A) whereby one type of laser pulses is applied a plurality of times during the formation and the erasure of the magnetic domain, respectively.

A method (B) whereby two types of laser pulses are combined and applied a plurality of times during the formation and the erasure of the magnetic domain, respectively.

The method (A) above will first be explained. In the implementation of this method, it is necessary that a magneto-optical recording apparatus be provided with a magnetic field generating device when recording signals (forming the magnetic domain) or erasing (erasing the magnetic domain) in the case where a predetermined external magnetic field is applied. However, the magnetic field generating device may be a conventionally-used permanent magnet or electromagnet or the like, and an initializing magnetic field or an AC magnetic field or the like is completely unnecessary.

With respect to the laser output, laser pulses with an intensity Pw, and an intensity of Pe are applied onto the magneto-optical recording medium during recording signals and erasure thereof, and a DC laser with an intensity of P1 is applied onto the magneto-optical recording medium during the reproduction of recorded signals, provided that P1<Pw and P1<Pe. Other than this, there is no particular mechanism to be added in implementing this method, and conventional magneto-optical recording apparatus can be used with only simple modifications.

Figure 2:
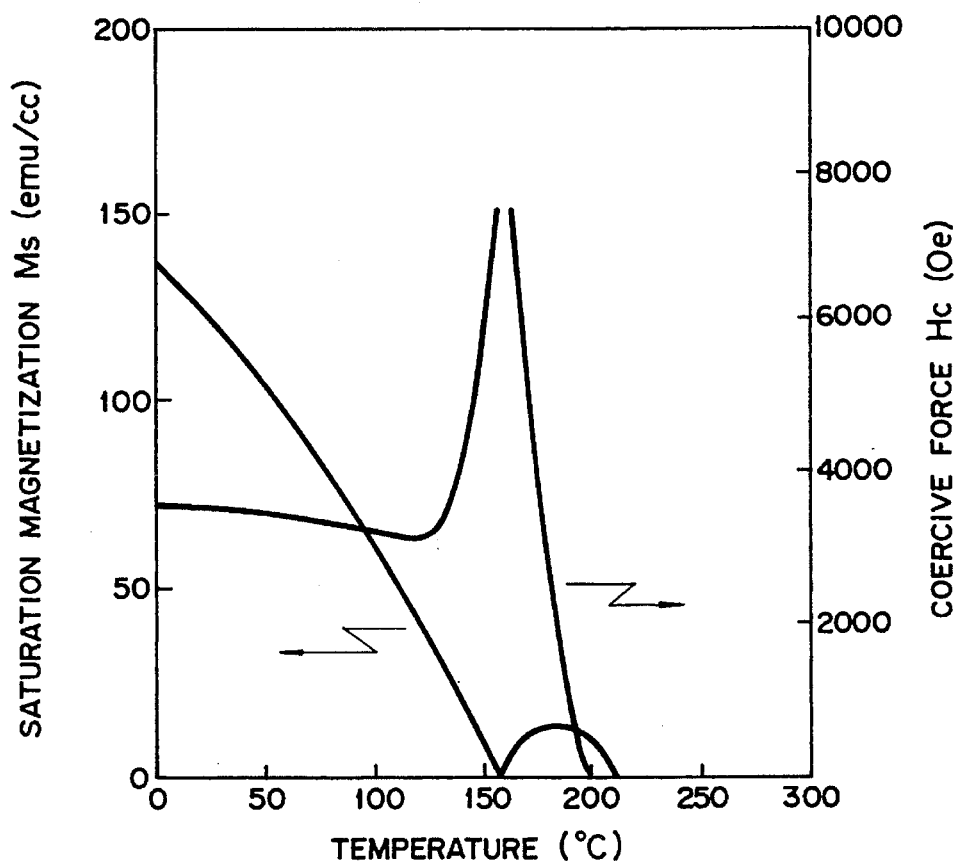
FIG. 2 is a characteristic diagram in explanation of the magneto-optical characteristics of a magnetic layer of a magneto-optical recording medium for use in the present invention.

The magneto-optical recording medium for use in the above-mentioned magneto-optical recording method will now be explained. As mentioned previously, the magneto-optical recording medium comprises a single perpendicular magnetic layer serving as the recording layer. It is preferable that the single perpendicular magnetic layer be a rare earth metal-transition metal (RE-TM) amorphous magnetic layer with a rare-earth-metal rich composition, with the compensation point Tcomp thereof being higher than room temperature as shown in FIG. 2.

Figure 3:
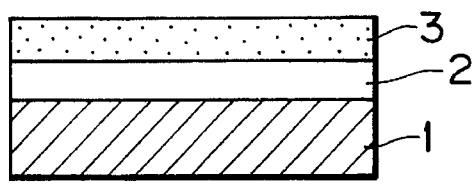
FIG. 3 is a schematic cross-sectional view of an example of a magneto-optical recording medium for use in the present invention.

The layer configuration of the magneto-optical recording medium is basically as shown in FIG. 3. An RE-TM amorphous magnetic layer 2 with the above-mentioned magnetic characteristics is formed, for example, by sputtering on a substrate 1 of glass or plastic, and a protective layer 3 is formed on the magnetic layer 2 to prevent deterioration of the magnetic layer 2. In addition, an undercoat layer (not shown) may be interposed between the substrate 1 and the magnetic layer 2 to improve the uniformity of the magnetic layer 2 and the characteristics of the reproduction signal. It is also possible to join together two of the media shown in FIG. 2 so that recording can be carried out on both sides, thus increasing the recording capacity.

Overwriting is achieved in this method using the above-mentioned very simple apparatus and medium, and, as described below, an especially desirable overwrite can be provided under the following conditions. Specifically, as shown in FIG. 1, when forming a magnetic domain, that is, when recording a signal, a laser pulse with an intensity Pw and a pulse width tw is applied continuously on several times until a magnetic domain with the desired length is formed. When erasing a magnetic domain, that is, when erasing a signal, a laser pulse with an intensity Pe and a pulse width te is applied continuously on several times until the magnetic domain has been erased to the desired length, provided that the relationships tw≧te, and Pw·tw>Pe·te are satisfied for Pw, Pe and tw, te. In this method, when the magnetic domain is formed, the edge of the magnetic domain can be reliably fixed and a magnetic domain with the desired length can be easily formed by applying a plurality of laser pulses.

Figure 4:
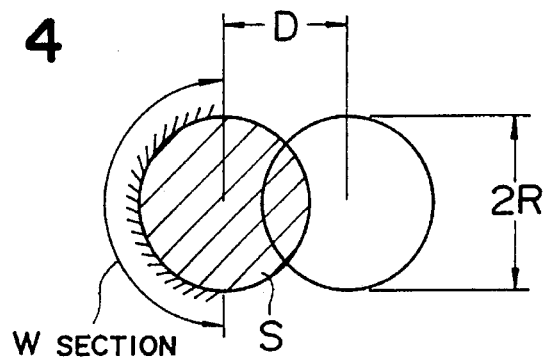
FIG. 4 is a diagram in explanation of the mechanism of the formation of the magnetic domain by the method of the present invention.

The mechanism of the formation of the magnetic domain can be explained in the following manner with reference to FIG. 4. Specifically, when the initial laser pulse is applied during the formation of the magnetic domain, a cylindrical magnetic domain S, with a radius R, is formed, provided that in the case where, prior to the application of the initial laser pulse, a magnetic domain already exists, that magnetic domain remains as is. A certain time interval after the application of the laser pulses, a second laser beam is applied, and at this time the center of the application moves to a position, offset by a certain distance D only from the center of the cylindrical magnetic domain. The heat transfer by this application exerts little influence on the domain wall w on the side far from the application center of the above-mentioned cylindrical magnetic domain. Accordingly, the domain wall w in this section is not moved by the application of the second laser beam, and is pinned or fixed under the initial conditions. Following this, such a state does not change for a third and subsequent laser beams. In short, the edge of the magnetic domain is securely pinned or fixed by the application of a pulse-shaped laser beam, and the edge portion of the magnetic domain with the desired length is easily formed. Furthermore, when the magnetic domain is erased, a plurality of laser pulses with a shape different from that used for forming the magnetic domain is applied, whereby it is possible to adjust the temperature of the recording layer to a temperature at which such a state can be reached at which the sum of the demagnetizing field energy imposed on the domain wall section, the domain wall energy, and the Zeeman energy is smaller than when the magnetic domain shrinks. Accordingly, the magnetic domain is eventually erased over the desired length without anything remaining.

In proposing this method, the inventors of the present invention prepared a large number of magneto-optical recording media, changing the composition, layer thickness, and the like, and investigated overwriting, using the following method:

First, a laser pulse with an intensity Pw and a pulse width tw was applied onto the magneto-optical recording medium under the application of a predetermined magnetic field Hex imposed in a direction perpendicular to the surface of the magnetic layer, and a range in which a magnetic domain was formed was obtained. The laser pulse application conditions at this time are hereinafter referred to as conditions A. Next, under the conditions A, the laser pulse was generated continuously and applied onto the magneto-optical recording medium, while this magneto-optical recording medium was slightly moved with respect to the laser beam, whereby striped magnetic domains were obtained.

A laser beam was again applied to the striped magnetic domains and the conditions under which the magnetic domains were cut. Such conditions are hereinafter referred to as conditions A'. Next, overwriting was implemented in practice under these conditions. Here, a sample magneto-optical recording medium comprising as the recording layer a TbFeCo amorphous magnetic layer with the temperature characteristics shown in FIG. 2 and a film thickness of 2000 Å was used for evaluation. In this magneto-optical recording medium, a glass substrate was used as the substrate, and a SiN layer was used as the protective layer.

Figure 5:
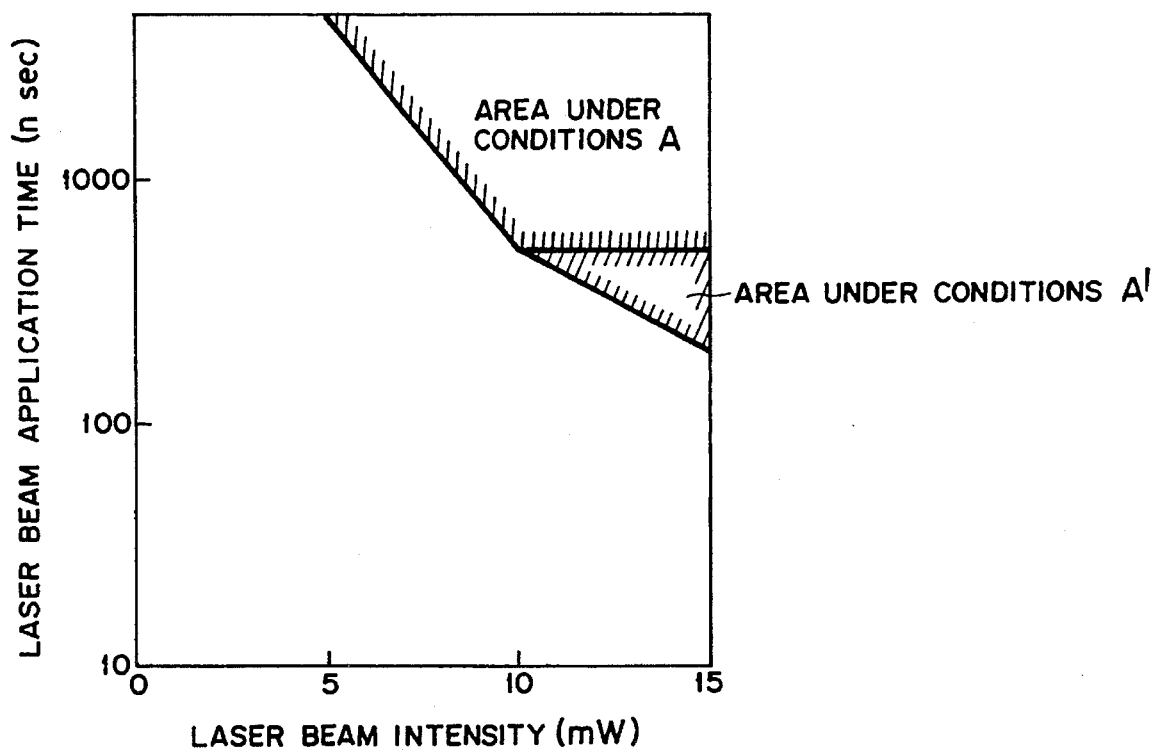
FIG. 5 is a diagram in explanation of the range of the recording conditions and erasure conditions of the method (A) of the first magneto-optical recording method according to the present invention.

FIG. 5 shows the above-mentioned A, A' conditions in the state where an external magnetic field of 100 Oe is applied in an advantageous direction (the opposite direction to the sublattice moment of the transition metal atoms) in recording in the magnetic domain. Among the conditions A, and A' shown in FIG. 5, 10 mW and 1000 nsec were set as the conditions A, and various changes were made in the intensity and laser application time for the conditions A', then 15 mW and 200 nsec were set as the conditions A', and various changes were made in the intensity and laser application time for the conditions A. Overwriting tests were made under these various conditions. Furthermore, the positions at which the laser pulses were applied to the magnetic layer surface were set at 8 μm intervals. As a result, as shown in FIG. 5, a magnetic domain was formed in the region corresponding to the conditions A, and either a magnetic domain was not formed in the section corresponding to the conditions A', or, in the case where a previous magnetic domain existed, this magnetic domain was completely erased. This was determined from the values of the two conditions A and A' only, without depending on the data previously recorded in the magnetic domain.

Table 1 shows examples of when overwriting is possible and when overwriting is not possible when the conditions A and the conditions A' were combined.

TABLE 1

| Conditions A' | Conditions A | Overwriting |
| --- | --- | --- |
| 10 mW, 500 nsec | 15 mW, 500 nsec | Possible |
|  | 10 mW, 1000 nsec | Possible |
|  | 10 mW, 500 nsec | Impossible |
|  | 7 mW, 2000 nsec | Possible |
|  | 7 mW, 1000 nsec | Impossible |
| 15 mW, 200 nsec | 15 mW, 500 nsec | Possible |
|  | 10 mW, 1000 nsec | Possible |
|  | 10 mW, 500 nsec | Impossible |
|  | 7 mW, 2000 nsec | Possible |
|  | 7 mW, 1000 nsec | Impossible |

It is clear from the above that a particularly desirable overwrite is possible in the case where tw≧te, and Pw·tw>Pe·te.

The method (B) above will now be explained. An apparatus of a very simple structure, as in the case of the method (A), can be used as the magneto-optical recording apparatus used in this method. Furthermore, the same medium used as the magneto-optical recording medium in the method (B) can be used in this method.

In proposing this method, the inventors of the present invention carried out the following experiments:

Samples were prepared using the same type of magneto-optical recording medium comprising a TbFeCo magnetic layer as used in the above-described overwrite tests for the method (A). A laser beam was applied to the sample, and recording and erasure were performed in the following manner.

The sample was held stationary during recording and laser pulses with various intensities and pulse widths were applied to the sample. The radius of each magnetic domain formed in this manner was measured. For erasure, laser beams were applied to each cylindrical magnetic domain with a 0.5 μm radius, also under various conditions, and the changes were investigated.

In the apparatus used, the optical pick-up was magnetically shielded to decrease the leakage of the magnetic field, and an external magnetic field of 100 Oe was applied in an advantageous direction (the opposite direction to the sub-lattice moment of the transition metal atoms) at the recording position on the sample.

Figure 6:
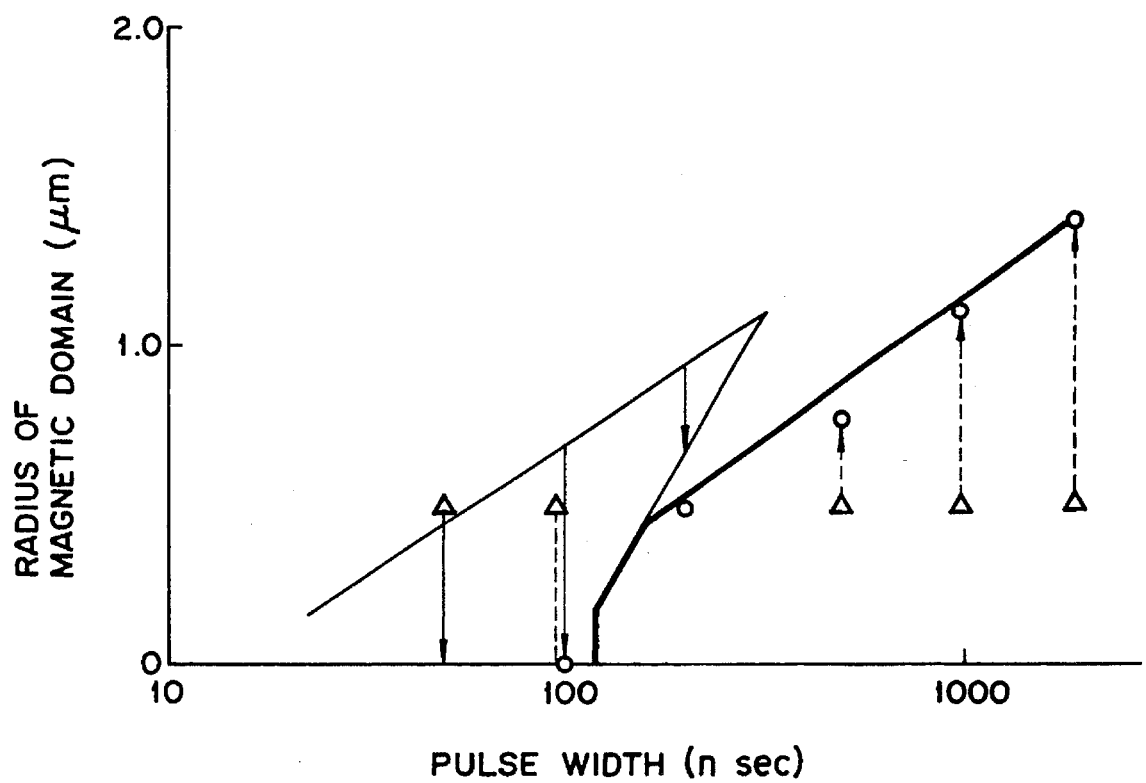
FIG. 6 is a graph showing the results of measurements of the radius of the magnetic domain when the pulse width of the laser beam was changed.
Figure 8A:
FIGS. 8(a) to 8(d) are diagrams in explanation of conventional magneto-optical recording methods.
Figure 8B:
Figure 8C:
Figure 8D:

FIG. 6 shows an example of the obtained results. More specifically, FIG. 6 gives the results of measurements of the radius of the magnetic domain when the pulse width was varied for a pulse intensity of 15 mW. The heavy solid line in the figure shows the results of the magnetic domain radius calculations (B. G. Huth; IBM J. RES. DEV., March 1974) based on the magnetic bubble theory, while the thin solid lines indicate the range of the radius of the magnetic domain, when the magnetic domain is caused to shrink or disappear by the application to the laser beam. The arrows show the changes in the radius of the magnetic domain when the laser beam is applied to the magnetic domain. The white circles "O" indicate the measured values of the radius of the recorded magnetic domain, while the dotted arrows indicate the observed changes in the radius of the magnetic domain when the laser beam is applied to the cylindrical magnetic domain (these radii of the magnetic domain being indicated by the symbol "Δ"). From these results it can be confirmed that in this sample it was possible to control the radius of the magnetic domain according to the application conditions of the laser beam. Furthermore, with respect to a sample in which the magnetic layer has the magnetic characteristics Tcomp<T1, and a sample in which the magnetic layer does not have a Tcomp, tests were performed in the same manner as outlined above, but in these samples the phenomenon of shrinking or disappearance of the magnetic domain is not observed.

Furthermore, the inventors of the present invention, based on the results of the above-mentioned experiments, have obtained conditions under which good overwriting could be performed by applying laser beams with pulses of various shapes (intensity, pulse width) to the sample having a magnetic layer exhibiting the characteristics shown in FIG. 2, while the sample was moved at a constant speed. It can be confirmed that a good overwrite can be performed under the conditions shown in FIG. 7(a) (conditions A, B, A', B'), specifically, $Pw1<Pe1$ $Pw1 \cdot tw1 > Pe1 \cdot te1$ $Pw2=Pe2$, and $tw2=te2$ wherein Pw1 and tw1 are the intensity and pulse width respectively of the first laser pulse applied during the formation of the magnetic domain; Pw2 and tw2 are the intensity and pulse width respectively of the second and subsequent laser pulses applied during the formation of the magnetic domain; Pe1 and te1 are the intensity and pulse width respectively of the first laser pulse applied during the erasure of the magnetic domain; and Pe2 and te2 are the intensity and pulse width respectively of the second and subsequent laser pulses applied during the erasure of the magnetic domain.

The roles of the conditions A, B, A', B' will now be explained as follows:

With respect to the conditions A, after the formation of a state in which there is no magnetic domain under the conditions B' which will be described later and lasts until immediately before the conditions A, a cylindrical magnetic domain carried under the conditions B' by a subsequent laser beam application under the conditions B' is received and the rear edge portion of the magnetic domain is pinned or fixed under the conditions A. Accordingly, it is necessary that a sufficiently sharp edge be formed, even under the environment in which heat after the laser beam application under the conditions B' remains. In the experiment, a laser pulse of 5 mW and 500 nsec was used.

With respect to the conditions B, immediately before the initiation of the conditions B, laser beam pulses are applied under the conditions A, so that the cylindrical magnetic domain is stabilized as mentioned previously. The the magnetic domain is extended while the magnetic domain on the far side of this cylindrical magnetic domain is fixed under the conditions B. For such conditions, the laser pulse of 15 mW and 200 nsec in FIG. 6 is preferable. At this time, the width of the magnetic domain is about 1.0 μm. In the case where the conditions B and the conditions B are in agreement, specifically, in the case where the previously stated conditions A of 5 mW and 500 nsec are also used as the conditions B, formation of the magnetic domain is possible. In this case, there is an advantage from the aspect of being able to reduce the load on the laser drive section, but, it is advantageous to set the conditions B independently, from the aspect of improving the speed of rotation of the disk and the recording frequency.

Under the conditions A', the application of laser beam pulses is carried out subsequent to the application of laser beam pulses under the previously-mentioned conditions B, and when the magnetic domain extended under the conditions B is cut, and a previously recorded magnetic domain remains in a section in which overwrite is to be performed, the previously recorded magnetic domain is erased. In this example, the laser pulse of 15 mW and 100 nsec in FIG. 6 was used.

Under the conditions B', after the magnetic domain is erased under the conditions A', the state in which there is no magnetic domain is continued until the next section of the magnetic domain is formed. In the example, a laser pulse of 15 mW and 200 nsec was used.

The point where B'=B will now be discussed. Both the case where the magnetic domain is extended (the conditions B), and the case where the state in which there is no magnetic domain is extended (the conditions B') are carried out under the same conditions. In the case of the B conditions, a cylindrical magnetic domain is formed in the laser-beam-pulse-applied section, and this is pulled in as far as the laser-beam-pulse-applied section under the next conditions B' (a laser beam pulse applied at an interval of D). Thus, the magnetic domain appears to move, apparently from the laser-beam-pulse-applied section to the next laser-beam-pulse-applied section. At this time, even though the previously recorded magnetic domain exists, it is assimilated in this cylindrical magnetic domain, and after the laser beam application under the conditions B', the magnetic domain disappears. Then, after the laser beam application under the conditions B is repeated several times, the cylindrical magnetic domain, which has moved as far as the last laser beam application section under the conditions B' is fixed by the laser beam application under the conditions A following the laser beam application under the conditions B', and becomes a new recorded magnetic domain. In the case of the laser beam application under the conditions B, since the magnetic domain fixed by the laser beam application under the conditions A cannot be drawn while retaining the cylindrical shape as is, the domain wall on the far side of the cylindrical magnetic domain formed by the laser beam application under the conditions A is fixed as is, and develops in a striped pattern.

In the case where a laser pulse such as that shown in FIG. 7(a) is applied, the magnetic domain is formed in the shape indicated by M in FIG. 7(b). Furthermore, one example of a combination of the conditions A, B, A', B' is given in Table 2.

TABLE 2

|  | P | t |
|---|---|---|
| Conditions A | 5 mW | 500 nsec |
| Conditions B | 15 mW | 200 nsec |
| Conditions A' | 15 mW | 100 nsec |
| Conditions B' | 15 mW | 200 nsec |

As opposed to this, when the application of a laser beam pulse under conditions such as illustrated in FIG. 7(c) and FIG. 7(d) is tried, good overwriting cannot be obtained even by combining such pulse intensities.

As described above in detail, according to the present invention, because of the above-mentioned structure, high speed overwriting is possible with a simple apparatus structure, and a unit of superior reliability is obtained. In addition, low power recording is possible, and the signal mark length modulation and mark edge recording are also suitable.

The second magneto-optical recording method according to the present invention will now be explained. This magneto-optical recording method is capable of carrying out overwriting on a magneto-optical recording medium comprising a single perpendicular magnetic layer serving as a recording layer by application of a laser beam with the application conditions thereof changed in such a manner that the laser beam application interval (D) with respect to the moving direction of a track on the magneto-optical recording medium and the width (W) of a magnetic domain on the magneto-optical recording medium are in the relationship of $0.1\ W \leq D \leq 2.0\ W$, preferably $0.4\ W \leq D \leq 1.2\ W$ under the application of a predetermined external magnetic field, preferably in the range of about 0 to 200 Oe. The laser beam application interval (D) means the distance between the position on a magneto-optical recording medium to which a laser beam is applied and the position on the magneto-optical recording medium to which a subsequent laser beam is applied.

By this magneto-optical recording method, the overwrite reliability can be improved. This magneto-optical recording method will now be specifically explained.

A SIN layer serving as an undercoat layer was formed on a glass substrate by the FR sputtering method. Thereafter, a TbFeCo layer serving as a magnetic recording layer was overlaid on the SiN layer by the FR sputtering method without being exposed to air. Furthermore, a SiN layer was formed on the TbFeCo layer for protecting the TbFeCo layer, whereby a magneto-optical recording medium was fabricated.

Figure 9:
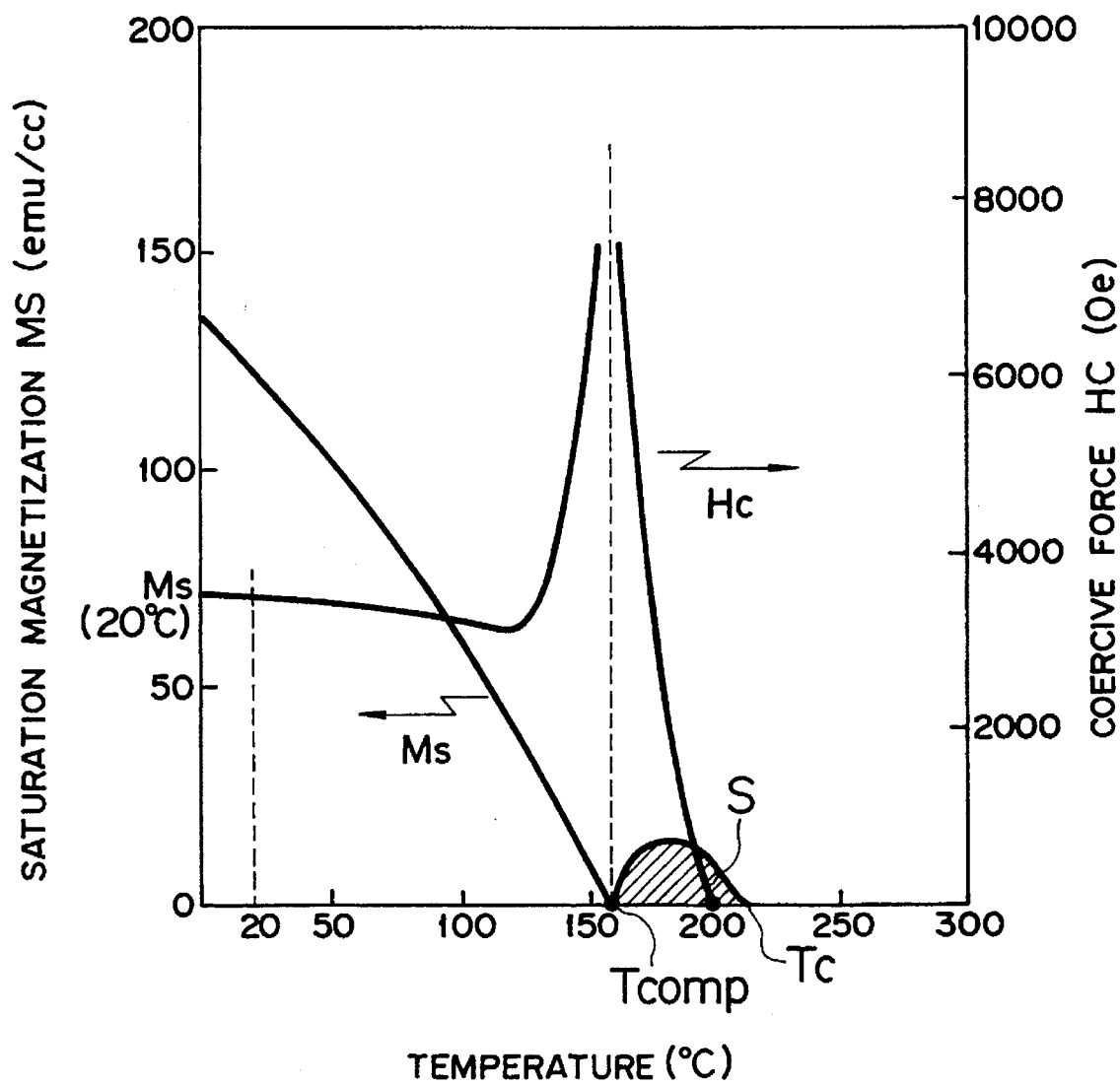
FIG. 9 is a characteristic diagram in explanation of the magneto-optical characteristics of a magnetic layer of a magneto-optical recording medium for use in the present invention.

FIG. 9 is a diagram showing the magneto-optical characteristics of the thus fabricated magneto-optical recording medium.

Experiments for evaluating the laser beam application interval (D) to be set to obtain the magnetic domain M at the position shown in FIG. 7(b) were conducted under the conditions A, A', and B for the application of laser beams as illustrated in FIG. 7(a). The power of the applied laser beam was 10 mW, and the pulse width thereof was 1000 nsec under the conditions A, the power of the applied laser beam was 15 mW, and the pulse width thereof was 200 nsec under the conditions A', and the power of the applied laser beam was 15 mW, and the pulse width thereof was 1000 nsec under the conditions B.

In the magneto-optical recording apparatus employed in these experiments, the optical pick-up was magnetically shielded to decrease the leakage of the magnetic field, and an external magnetic field of 100 Oe was applied in the opposite direction to the sublattice magnetization of FeCo at the recording position on the magneto-optical recording medium. In the experiments, the laser beam was applied to the magneto-optical recording medium while moved in a range of 20 μm at a constant speed at which the magneto-optical recording medium can be observed by a microscope, whereby whether or not overwrite can be performed was investigated.

Figure 10:
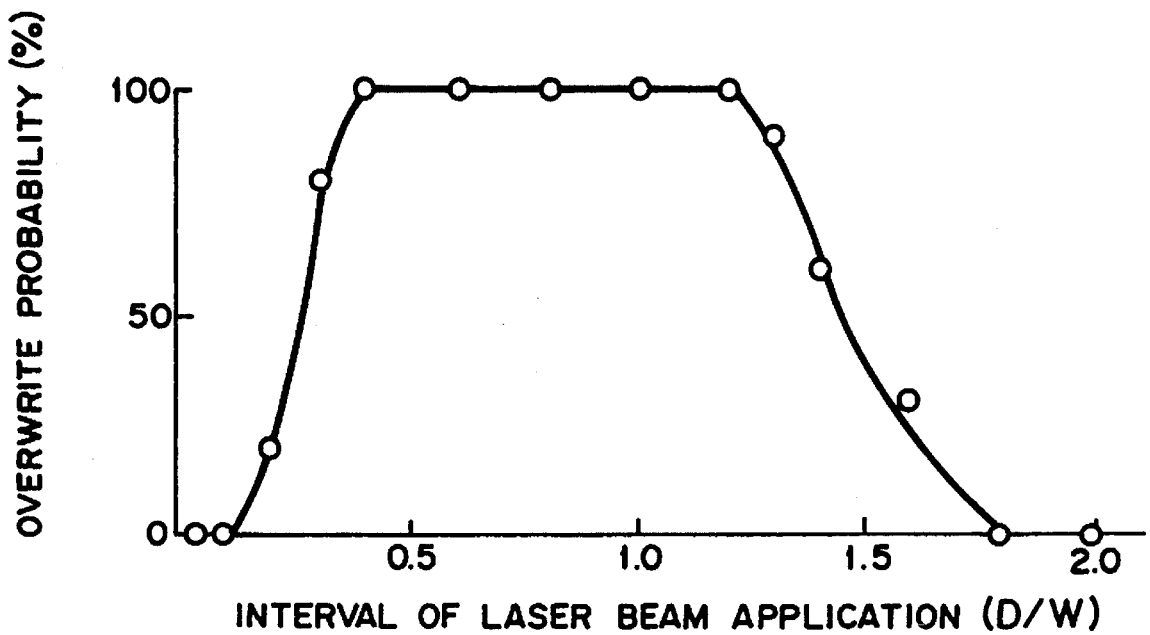
FIG. 10 is a graph showing the results of overwrite experiments.

FIG. 10 shows the results of the experiments. The data shown in FIG. 10 was obtained by conducting the overwrite experiments more than ten times using various combinations of the laser pulses under the three conditions A, A' and B and processing the results statistically.

As can be seen from the results shown in FIG. 10, particularly excellent overwrite was carried out when $0.4\ W \leq D \leq 1.2\ W$. However, by changing the conditions under which laser beams are applied, the external magnetic field, and the magneto-optical recording medium, it has been confirmed that good overwrite can be accomplished even when $0.1\ W \leq D \leq 2.0\ W$.

Figure 11:
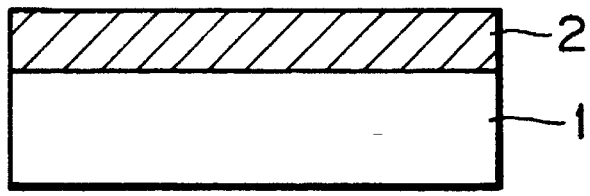
FIG. 11 is a schematic cross-sectional view of a magneto-optical recording medium with a basic structure for use in the present invention.

The magneto-optical recording medium for use in the above-mentioned magneto-optical recording method will now be explained. As shown in FIG. 11, the magneto-optical recording medium comprises a substrate and a single perpendicular magnetic layer 2, serving as the recording layer, formed on the substrate 1. The substrate 1 is made of a transparent material such as glass, polycarbonate, polymethyl methacrylate, or polyolefin. It is preferable that the single perpendicular magnetic layer be a rare earth metal-transition metal (RE-TM) alloy amorphous magnetic layer with the temperature characteristics with respect to layer with the temperature characteristics with respect to shown in FIG. 9. In this RE-TM alloy amorphous magnetic layer, the compensation point Tcomp thereof is between room temperature Tr and the Curie temperature Tc thereof.

The layer configuration of the magneto-optical recording medium is basically as shown in FIG. 11. A protective layer 3 may be provided on the magnetic layer 2 as shown in FIG. 3. It is also possible to join together two of the media shown in FIG. 11 so that recording can be carried out on both sides, thus increasing the recording capacity.

The overwriting by the above magneto-optical recording method is carried out by use of the above-mentioned magneto-optical recording medium, by changing the conditions under which laser beams are applied, under the application of a predetermined external magnetic field.

Figure 12:
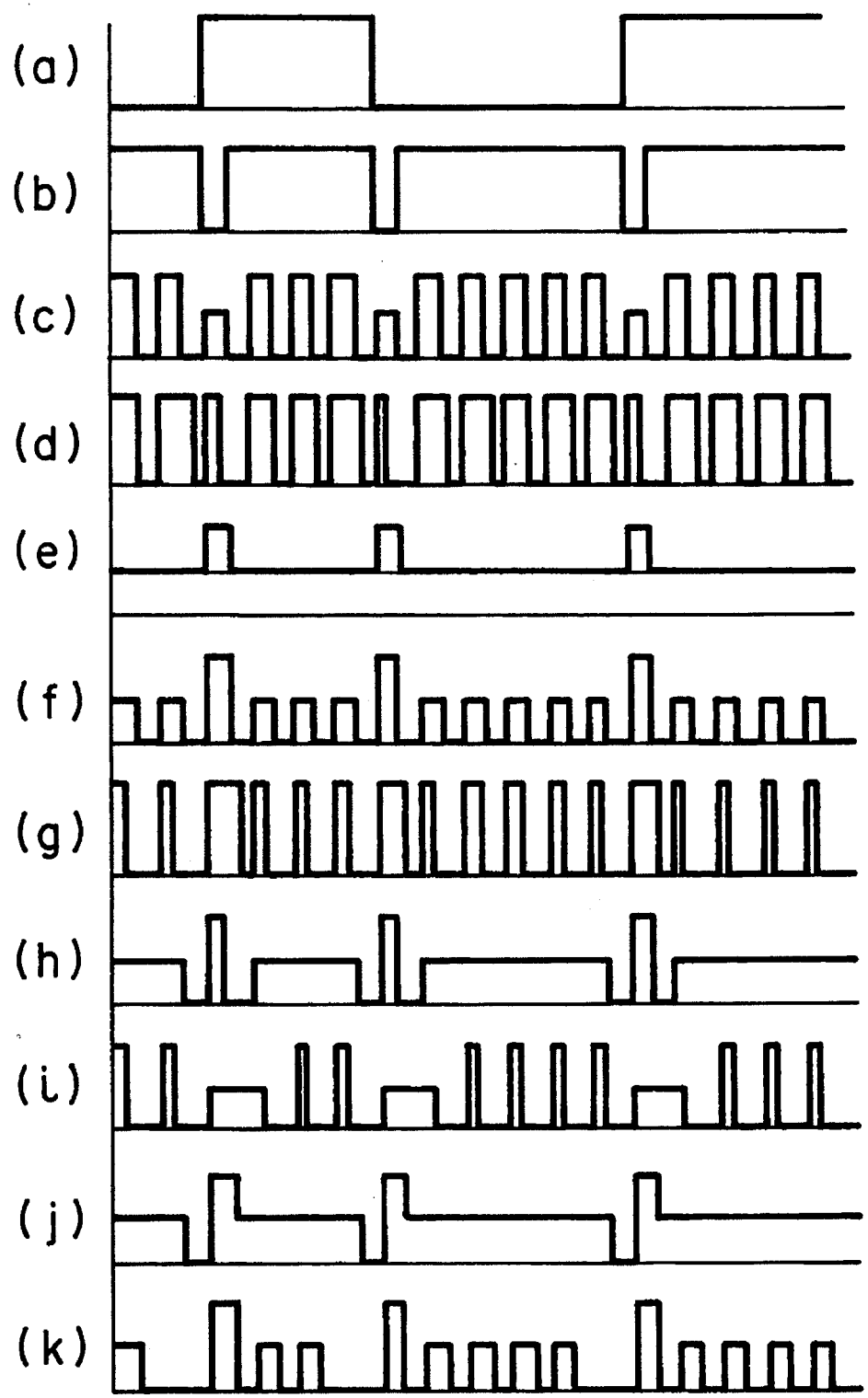
FIG. 12 is a diagram in explanation of laser beam application modes for use in the magneto-optical recording method of the present invention.

The conditions for applying laser beams can be generally changed by various methods employed in a light modulation system. In the present invention, the following three methods are preferable:

In the first method which is proposed by the inventors of the present invention in Japanese Patent Application 2-64959, when recording is conducted by the application of a laser beam, the spot diameter, pulse width and application power of the laser beam, and the pulse shape such as a single pulse or a continuous pulse are changed when the magnetization direction for recording is switched from downward to upward or from upward to downward. FIG. 12 shows this laser application method. In the figure, (a) indicates a recording information signal, and (b) to (k) indicate examples of the laser beam application mode.

Figure 13:
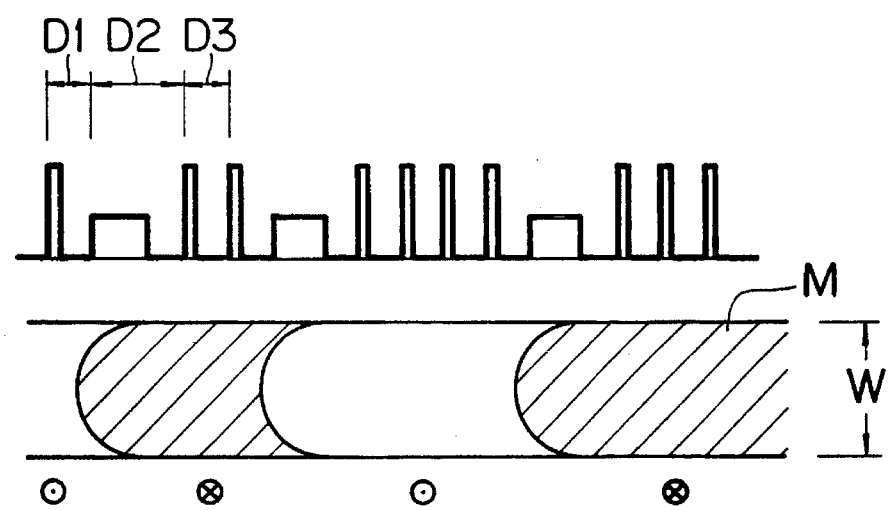
FIG. 13 is a diagram showing a magnetic domain formed by one of the laser beam application modes shown in FIG. 12.

FIG. 13 shows the relationship between the laser pulse and the recording magnetic domain when the laser application mode (i) was employed. In this case, $D_1$, $D_2$ and $D_3$ satisfy the previously mentioned relationship.

The second method is the method which has been explained with reference to FIG. 1. As mentioned previously, the application of laser beams is conducted in a such manner as to satisfy the relationships tw≧te and Pw·tw>Pe·te in this method. More specifically, when a magnetic domain is formed, a laser pulse with an intensity Pw and a pulse width tw is applied several times in succession to obtain a magnetic domain with a desired length, and when the magnetic domain is erased, a laser pulse with an intensity Pe and a pulse width te is applied several times in succession to obtain an erased magnetic domain with a desired length.

The third method is the method which has been explained with reference to FIG. 7. In this method, the application of laser beams is conducted under a predetermined magnetic field in such a manner as to satisfy the relationships:

Pw1<Pe1

Pw1·tw1>Pe1·te1

Pw2=Pe2, and tw2=te2 wherein Pw1 is the intensity of the first laser pulse applied during the formation of a magnetic domain, tw1 is the pulse width thereof, Pw2 is the intensity of the second and subsequent laser pulses applied during the formation of magnetic domains and tw2 is the pulse width thereof; and Pe1 is the intensity of the first laser pulse applied during the erasure of the magnetic domain and te2 is the pulse width thereof, and Pe2 is the intensity of the second and subsequent laser pulses applied during the erasure of the magnetic domain and te2 is the pulse width thereof.

The third magneto-optical recording method according to the present invention will now be explained. This magneto-optical recording method is capable of carrying out over-writing on a magneto-optical recording medium comprising a perpendicular magnetic layer serving as a recording layer by the application of a laser beam, in an elliptic shape elongated in the direction of a track in the magneto-optical recording medium, with the power and/or pulse width thereof changed, thereby controlling the displacement of a domain wall in the perpendicular magnetic layer.

Generally, the shape of an output semiconductor laser beam for use in optical recording is elliptic. Therefore, when the laser beam is used as it is, the beam spot concentrated on the surface of a recording medium spreads in an elliptic shape, so that the recording density is decreased. In order to avoid this, the following methods are used:

(1) Only a circular portion in the central portion of the output beam is employed.
(2) The shape of the output beam is modified to a circular shape by use of a prism.
(3) The shape of the output beam is modified to a circular shape by use of a plurality of cylindrical lenses.

These methods, however, reduce the light utilization ratio. The light utilization ratios of the methods (2) and (3) are smaller than that of the method (1). However, the methods (2) and (3) have the shortcoming that a complicated apparatus is necessary for the implementation of such methods.

The inventors of the present invention have proposed a new magneto-optical recording method of a domain wall moving type in Japanese Patent Application 2-64959. In this magneto-optical recording method, overwrite is accomplished by controlling the displacement of a domain wall. The displacement of the domain wall is controlled by changing the power of a laser beam applied to a magneto-optical recording medium comprising a perpendicular magnetic layer, and/or the pulse width of the laser beam to change the domain wall energy of the perpendicular magnetic layer or the state of the demagnetizing field.

According to this method, the magnetic layer of the magneto-optical recording medium for use in this method may be of a single layer type, and write-in can be carried out with a lower laser power than the laser power necessary for a two-layered type recording medium. Furthermore, new signals can be written in independently of the previously written signal, and the length of magnetic domains can be controlled easily, so that overwrite can be accomplished at high speed by use of a simple apparatus.

In such a magneto-optical recording method, the temperature gradation in the direction of the track at a cooling process is important. Since the beam spot diameter in the direction parallel to the track is not directly related to the recording density, the recording density is not decreased even when the spot shape of the recording laser beam is elliptic. In other words, since the beam spot diameter perpendicular to the track is the same as that processed by any of the previously mentioned methods (1) to (3), the density of the magnetic domains for recording is not changed. Therefore in the present invention, the elliptic output beam of semi-conductor laser is used as it is.

Figure 14:
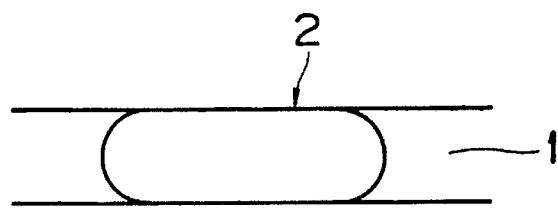
FIG. 14 is a diagram showing the shape of a beam spot employed in the present invention.

FIG. 14 shows the relationship between a track 1 and a recording beam spot 2. When an elliptic laser beam spot elongated in the direction of the track 1 is applied to the track 1, the temperature gradient in the direction perpendicular to the track is steep, while the temperature gradient in the direction parallel to the track is gentle, so that the magnetic wall is easy to move in the direction of the track, but difficult to move in the direction perpendicular to the track.

It is perferable that the ratio of the major axis to the minor axis of the elliptic recording laser beam spot for use in the above method be in the range of (1.5:1) to (1:10).

Figure 15:
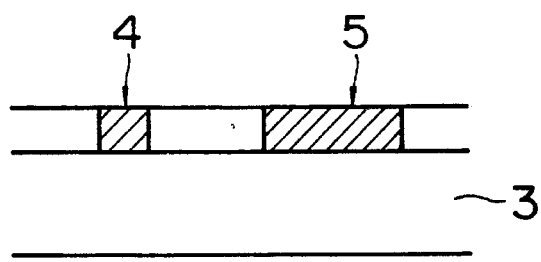
FIG. 15 is a diagram showing the end planes of a semiconductor laser for forming laser beams for use in the present invention.

More specifically, FIG. 15 schematically shows the end plane 3 of a semi-conductor laser. As shown in FIG. 15, the ratio of the longitudinal length to the transverse length of the exit plane 4 of a laser beam for reproduction is approximately 1:1, while in the case of a laser beam for recording, the exit plane 5 thereof has a longer transverse length than the longitudinal length.

Figure 16A:
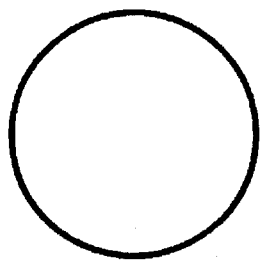
FIG. 16(a) shows the shape of the output laser beam for reproduction from the semiconductor laser shown in FIG. 15.
Figure 16B:
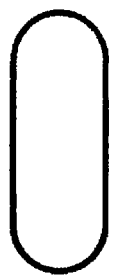
FIG. 16(b) shows the shape of the output laser beam for recording from the semiconductor laser shown in FIG. 15.
Figure 17:
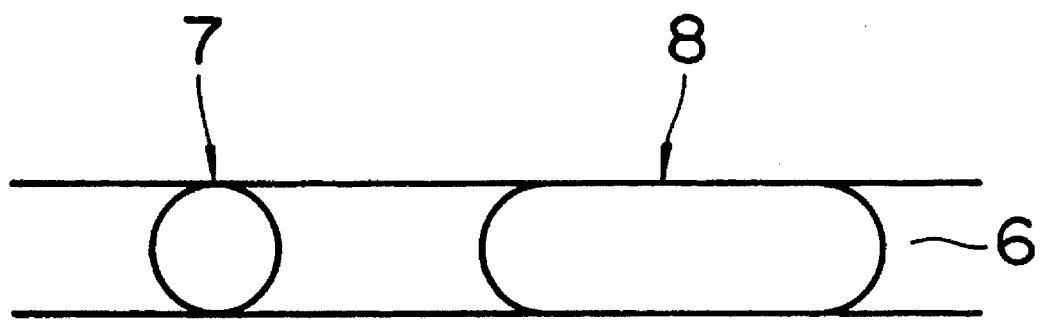
FIG. 17 shows the shape of the output laser beam spot for reproduction and the shape of the output laser beam spot for recording on the surface of a recording medium.

Generally, since the exit plane of a semiconductor laser is shared by the laser for reproduction and by the laser for recording, the transverse length cannot be made larger than the longitudinal length. In the present invention, however, since the exit plane for the laser for reproduction and the exit plane for the laser for recording are separately provided, the transverse length of the exit plane for the laser for recording be made larger than the longitudinal length thereof. In this case, however, the output power of the laser beam for reproduction cannot be made larger, but the output beam is in the shape of a circle as illustrated in FIG. 16(a), and the beam spot thereof can be narrowed as shown by a laser beam spot 7 for reproduction in FIG. 17. On the other hand, since the exit area for the output power of the laser beam for recording can be made large, the output power can be increased. The result is that the shape of the output beam becomes elliptic as shown in FIG. 16(b) and the beam spot 8 for recording becomes elliptic as shown in FIG. 17. For this reason, a recording laser beam with high output power can be utilized with high efficiency. As mentioned above, the output power of the laser beam for reproduction cannot be made large. However, this is not a problem because high power is not necessary for reproduction. Furthermore, since the laser beam can be narrowed, high density recording can be accomplished.

The conditions for applying laser beams can be changed by the previously mentioned disclosed in Japanese Patent Application 2-64959 or by the method mentioned with reference to FIG. 1.

What is claimed is:

1. A magneto-optical recording method for overwriting on a magneto-optical recording medium comprising a single perpendicular magnetic layer serving as a recording layer, said method comprising applying, to said magnetic layer, laser beam pulses for forming and erasing magnetic domains, in which a plurality of laser beam pulses are applied to form a magnetic domain having a desired length and a plurality of laser beam pulses are applied to erase a region having a desired length.

2. The magneto-optical recording method as claimed in claim 1, wherein a plurality of one type of laser pulses is applied during each of the formation or the erasure of said magnetic domain.

3. The magneto-optical recording method as claimed in claim 2, wherein the formation of said magnetic domain and the erasure thereof satisfy the relationships $tw \geq te$, and $Pw \cdot tw > Pe \cdot te$, wherein Pw is the intensity of a laser pulse applied during the formation of said magnetic domain, tw is the pulse width thereof, and Pe is the intensity of a laser pulse applied during the erasure of said magnetic domain, and te is the pulse width thereof.

4. The magneto-optical recording method as claimed in claim 1, wherein a plurality of two types of laser pulses is combined and applied during each of the formation or the erasure of said magnetic domain.

5. The magneto-optical recording method as claimed in claim 4, wherein a first laser pulse of said laser pulses applied and a second and subsequent laser pulses are of different types.

6. The magneto-optical recording method as claimed in claim 5, wherein when the intensity of said first laser pulse applied during the formation of a magnetic domain is Pw1 and the pulse width thereof is tw1, and the intensity of said second and subsequent laser pulses applied during the formation of magnetic domains is Pw2 and the pulse width thereof is tw2, and when the intensity of said first laser pulse applied during the erasure of said magnetic domain is Pe1 and the pulse width is te1 and the intensity of said second and subsequent laser pulses applied during the erasure of said magnetic domains is Pe2 and the pulse width thereof is te2; the relationships:

$Pw1 < Pe1$ $Pw1 \cdot tw1 > Pe1 \cdot te1$ $Pw2 = Pe2$, and $tw2 = te2$ are satisfied.

7. A magneto-optical recording method for overwriting on a magneto-optical recording medium comprising a single perpendicular magnetic layer serving as a recording layer, said method comprising applying, to said magnetic layer, a laser beam while varying the application conditions thereof in such a manner that the laser beam application interval (D) with respect to the moving direction along a track on the magneto-optical recording medium and the width (W) of a magnetic domain on the magneto-optical recording medium are in the relationship of $0.1\ W \leq D \leq 2.0\ W$, under the application of a predetermined external magnetic field.

* * * * *